United States Patent
Baba

(10) Patent No.: US 7,721,249 B2
(45) Date of Patent: May 18, 2010

(54) USER INTERFACE APPARATUS, PROCESSING APPARATUS, USER INTERFACE METHOD, PROGRAM FOR IMPLEMENTING THE METHOD, AND STORAGE MEDIUM STORING THE PROGRAM

(75) Inventor: Tatsuru Baba, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1324 days.

(21) Appl. No.: 11/195,051

(22) Filed: Aug. 2, 2005

(65) Prior Publication Data

US 2006/0031238 A1 Feb. 9, 2006

(30) Foreign Application Priority Data

Aug. 4, 2004 (JP) .............................. 2004-228376

(51) Int. Cl.
*G06F 7/00* (2006.01)
(52) U.S. Cl. ...................... 717/100; 717/120; 717/106; 710/19
(58) Field of Classification Search ................. 717/100, 717/120, 106; 710/19
See application file for complete search history.

(56) References Cited

U.S. PATENT DOCUMENTS

| 7,005,979 | B2 * | 2/2006 | Haughawout et al. ..... 340/539.1 |
| 2002/0101599 | A1 * | 8/2002 | Okimoto et al. ............ 358/1.13 |
| 2003/0103088 | A1 * | 6/2003 | Dresti et al. ................. 345/835 |
| 2003/0188266 | A1 * | 10/2003 | Croce et al. .................... 716/1 |
| 2004/0266419 | A1 * | 12/2004 | Arling et al. ................ 455/420 |
| 2006/0129941 | A1 * | 6/2006 | Hollemans ................... 715/740 |

FOREIGN PATENT DOCUMENTS

| JP | 5-246111 A | 9/1993 |
| JP | 8-329338 A | 12/1996 |

* cited by examiner

*Primary Examiner*—Tim T. Vo
*Assistant Examiner*—Mahesh H Dwivedi
(74) *Attorney, Agent, or Firm*—Rossi, Kimms & McDowell, LLP

(57) ABSTRACT

A user interface apparatus which is capable of registering a substitute processing operating procedure that can be performed by another apparatus on a network. It is determined whether or not processing specific to a MFP 110 is included in processing corresponding to a processing operating procedure when the processing operating procedure is registered. A user is urged to register a substitute processing operating procedure when it is determined that the processing specific to the MFP 110 is included in the processing corresponding to the processing operating procedure registered.

4 Claims, 11 Drawing Sheets

FIG. 8

| | 2001 | 2002 | 2000 |
|---|---|---|---|

| KEY ID #0 | FUNCTION ID #0 | 0 |
|---|---|---|
| KEY ID #1 | FUNCTION ID #0 | 0 |
| KEY ID #2 | FUNCTION ID #1 | 1 |
| KEY ID #3 | FUNCTION ID #2 | 0 |
| KEY ID #4 | FUNCTION ID #3 | 1 |
| ⋮ | ⋮ | |
| KEY ID #m | FUNCTION ID #n | 0 |

2003

USER INTERFACE APPARATUS, PROCESSING APPARATUS, USER INTERFACE METHOD, PROGRAM FOR IMPLEMENTING THE METHOD, AND STORAGE MEDIUM STORING THE PROGRAM

BACKGROUND OF THE INVENTION

1. Field of the Invention

The present invention relates to a user interface apparatus, a processing apparatus, and a user interface method, which provide interface between a device or apparatus and a user, a program for implementing the method, and a storage medium storing the program.

2. Description of the Related Art

In recent years, multi-function peripherals (hereinafter referred to as "MFPs") have appeared, which are capable of providing users with a plurality of functions such as a copy function, a print function, a facsimile function, a scanned image transmitting/receiving function, and an electronic mail (hereinafter referred to as "e-mail") function and MFPs have been used to enhance the efficiency of office work. Moreover, to further enhance the efficiency of office work, attempts have been made to expand functionality of MFPs.

However, the expansion of the functionality of the MFP complicates operations required for a user to carry out. As a result, sometimes, the user cannot make full use of many useful functions provided by the MFP. For this reason, to increase the operability of the MFP by the user, a MFP having a function of registering a plurality of operations to be collectively carried out by a single operating button has been proposed and realized.

As an example of an apparatus of this kind, there has been proposed a printing apparatus having a macro registration function of registering the types and orders of pressing of a plurality of operating keys which have been pressed, using key codes generated when the operating keys are pressed and performing a series of operations which have been registered by a call key (for example, refer to Japanese Laid-Open Patent Publication (Kokai) No. H05-246111). Moreover, there has been proposed a method for preventing erroneous macro registration by storing the macro function while performing a function corresponding to an operating key in the same manner as the function is performed in actual operation at the time of registration of the macro function (for example, refer to Japanese Laid-Open Patent Publication (Kokai) No. H08-329338).

However, when a user calls and uses a macro function registered in an apparatus in another apparatus different in kind from the apparatus with this macro function registered therein, if a specific operation or setting content is included in the called-up macro function, the user cannot normally perform the macro function, which results in interruption of the processing being performed by the user.

In this case, the user needs to carry out an additional operation such as searching for an apparatus capable of normally performing the desired macro function and carrying out the same processing again, or carrying out again operations registered as the macros function one by one, which results in degraded efficiency of the user's operation.

SUMMARY OF THE INVENTION

It is a first object of the present invention to provide a user interface apparatus, a processing apparatus, and a user interface method, which are capable of registering a substitute processing operating procedure that can be performed by another apparatus on a network, a program for implementing the method, and a storage medium storing the program.

It is a second object of the present invention to provide a user interface apparatus, a processing apparatus, a user interface method, which are capable of calling a substitute processing operating procedure of substitute processing that substitutes for processing corresponding to an operating procedure called from another apparatus on a network, from the other apparatus, to thereby make the substitute processing operating procedure usable for processing when the called processing cannot be performed, a program for implementing the method, and a storage medium storing the program.

To attain the above object, in a first aspect of the present invention, there is provided a user interface apparatus for providing interface between an apparatus and a user comprising a first registering device that registers at least one processing operating procedure for performing processing by the apparatus, a second registering device that registers a substitute processing operating procedure for performing substitute processing that substitutes for the processing corresponding to the processing operating procedure registered by the first registering device, in association with the processing operating procedure registered by the first registering device, a determining device that determines whether or not processing specific to the apparatus is included in the processing corresponding to the processing operating procedure registered by the first registering device when the processing operating procedure is registered by the first registering device, and a notifying device that urges a user to register the substitute processing operating procedure of the substitute processing when the determining device determines that the processing specific to the apparatus is included in the processing corresponding to the processing operating procedure registered by the first registering device.

Preferably, the first registering device registers the processing operating procedure using a first operating key assigned thereto, and when the first operating key is operated, the apparatus performs the processing operating procedure to select and set the processing corresponding to the processing operating procedure, and the second registering device registers the substitute processing operating procedure using a second operating key assigned thereto, which is different from the first operating key, and when the second operating key is operated, the apparatus performs the substitute processing operating procedure to select and set the substitute processing corresponding to the substitute processing operating procedure.

Also preferably, the apparatus has at least one option unit, the user interface apparatus comprising an apparatus configuration information storing device that stores apparatus configuration information indicating whether or not the option unit is specific to the apparatus, and the determining device determines with reference to the apparatus configuration information whether or not processing specific to the apparatus is included in the processing corresponding to the processing operating procedure registered by the first registering device.

To attain the above object, in a second aspect of the present invention, there is provided a user interface apparatus for providing interface between an apparatus and a user, the apparatus being communicatable with at least one other apparatus having registered therein a processing operating procedure for performing processing and a substitute processing operating procedure for performing substitute processing that substitutes for the processing corresponding to the processing operating procedure, via a network, the user interface apparatus comprising a calling device that calls the processing operating procedure and the substitute processing operating procedure associated with the processing operating procedure, which are registered in the other apparatus, via the network, a determining device that determines whether or not the processing corresponding to the processing operating procedure can be performed by the apparatus when the processing operating procedure is called by the calling device, and a notifying device that urges a user to call and use the substitute processing operating procedure associated with the processing operating procedure when the determining device determines that the processing corresponding to the called processing operating procedure cannot be performed by the apparatus.

Preferably, the user interface apparatus comprising a registering device that registers the substitute processing operating procedure when the substitute processing operating procedure is called by the calling device.

Also preferably, the apparatus has at least one option unit, the user interface apparatus comprising an apparatus configuration information storing device that stores apparatus configuration information indicating whether or not the option unit is specific to the apparatus, and the determining device determines with reference to the apparatus configuration information whether or not the processing corresponding to the called processing operating procedure can be performed by the apparatus.

To attain the above object, in a third aspect of the present invention, there is provided a processing apparatus comprising a reading device that reads an original document to generate image data, and a user interface apparatus that gives an instruction for processing the image data generated by the reading device, wherein the user interface apparatus comprises a first registering device that registers at least one processing operating procedure for performing processing by the apparatus, a second registering device that registers a substitute processing operating procedure for performing substitute processing that substitutes for the processing corresponding to the processing operating procedure registered by the first registering device, in association with the processing operating procedure registered by the first registering device, a determining device that determines whether or not processing specific to the apparatus is included in the processing corresponding to the operating procedure registered by the first registering device when the processing operating procedure is registered by the first registering device, and a notifying device that urges a user to register the substitute processing operating procedure of the substitute processing when the determining device determines that the processing specific to the apparatus is included in the processing corresponding to the processing operating procedure registered by the first registering device.

To attain the above object, in a fourth aspect of the present invention, there is provided a processing apparatus comprising a reading device that reads an original document to generate image data, and a user interface apparatus that gives an instruction for processing the image data generated by the reading device, wherein the user interface apparatus comprises a calling device that calls the processing operating procedure and the substitute processing operating procedure associated with the processing operating procedure, which are registered in the other apparatus, via the network, a determining device that determines whether or not the processing corresponding to the processing operating procedure can be performed by the apparatus when the processing operating procedure is called by the calling device, and a notifying device that urges a user to call and use the substitute processing operating procedure associated with the processing operating procedure when the determining device determines that the processing corresponding to the called processing operating procedure cannot be performed by the apparatus.

To attain the above object, in a fifth aspect of the present invention, there is provided a user interface method of registering at least one processing operating procedure for performing processing by an apparatus, comprising a determining step of determining whether or not processing specific to the apparatus is included in the processing corresponding to the processing operating procedure registered when the processing operating procedure for performing processing by the apparatus is registered, and a notifying step of urging a user to register a substitute processing operating procedure for performing the substitute processing that substitutes for the processing corresponding to the processing operating procedure when it is determined in the determining step that the processing specific to the apparatus is included in the processing corresponding to the processing operating procedure registered.

To attain the above object, in a sixth aspect of the present invention, there is provided a user interface method for an apparatus that is communicatable with at least one other apparatus having registered therein a processing operating procedure for performing processing and a substitute processing operating procedure for performing substitute processing that substitutes for the processing corresponding to the processing operating procedure, via a network, the user interface method comprising a calling step of calling the processing operating procedure and the substitute processing operating procedure associated with the processing operating procedure, which are registered in the other apparatus, via the network, a determining step of determining whether or not the processing corresponding to the processing operating procedure can be performed by the apparatus when the processing operating procedure is called in the calling step, and a notifying step of urging a user to call and use the substitute processing operating procedure associated with the processing operating procedure when it is determined in the determining step that the processing corresponding to the called processing operating procedure cannot be performed by the apparatus.

To attain the above object, in a seventh aspect of the present invention, there is provided a program executable by an apparatus to construct interface between the apparatus and a user, comprising a first registering module for registering at least one processing operating procedure for performing processing by the apparatus, a second registering module for registering a substitute processing operating procedure for performing substitute processing that substitutes for the processing corresponding to the processing operating procedure registered by the first registering module, in association with the processing operating procedure registered by the first registering module, a determining module for determining whether or not processing specific to the apparatus is included in the processing corresponding to the processing operating procedure registered by the first registering module when the processing operating procedure is registered by the first registering module, and a notifying module for urging a user to register the substitute processing operating procedure of the substitute processing when the determining module determines that the processing specific to the apparatus is included in the processing corresponding to the processing operating procedure registered by the first registering module.

To attain the above object, in an eighth aspect of the present invention, there is provided a program executable by an apparatus that is communicatable with at least one other apparatus having registered therein a processing operating procedure for performing processing and a substitute processing operating procedure for performing substitute processing that substitutes for the processing corresponding to the processing operating procedure, via a network, so as to construct interface between the apparatus and a user, the program comprising, a calling module for calling the processing operating procedure and the substitute processing operating procedure associated with the processing operating procedure, which are registered in the other apparatus, via the network, a determining module for determining whether or not the processing corresponding to the processing operating procedure can be performed by the apparatus when the processing operating procedure is called by the calling module, and a notifying module for urging a user to call and use the substitute processing operating procedure associated with the processing operating procedure when the determining module determines that the processing corresponding to the called processing operating procedure cannot be performed by the apparatus.

To attain the above object, in a ninth aspect of the present invention, there is provided a storage medium storing a program in a manner readable by a computer, wherein the program comprises a first registering module for registering at least one processing operating procedure for performing processing by the apparatus, a second registering module for registering a substitute processing operating procedure for performing substitute processing that substitutes for the processing corresponding to the processing operating procedure registered by the first registering module, in association with the processing operating procedure registered by the first registering module, a determining module for determining whether or not processing specific to the apparatus is included in the processing corresponding to the processing operating procedure registered by the first registering module when the processing operating procedure is registered by the first registering module, and a notifying module for urging a user to register the substitute processing operating procedure of the substitute processing when the determining module determines that the processing specific to the apparatus is included in the processing corresponding to the processing operating procedure registered by the first registering module.

To attain the above object, in a tenth aspect of the present invention, there is provided a storage medium storing a program in a manner readable by a computer, wherein the program comprises a calling module for calling the processing operating procedure and the substitute processing operating procedure associated with the processing operating procedure, which are registered in the other apparatus, via the network, a determining module for determining whether or not the processing corresponding to the processing operating procedure can be performed by the apparatus when the processing operating procedure is called by the calling module, and a notifying module for urging a user to call and use the substitute processing operating procedure associated with the processing operating procedure when the determining module determines that the processing corresponding to the called processing operating procedure cannot be performed by the apparatus.

According to the present invention, it is possible to register a substitute processing operating procedure that can be performed by another apparatus on the network.

Moreover, according to the present invention, when processing corresponding to an operating procedure called from another apparatus on the network cannot be performed, it is possible to call from the other apparatus a substitute processing operating procedure of substitute processing that substitutes for the processing corresponding to the operating procedure called from the other apparatus to thereby make the substitute processing operating procedure usable for processing.

The above and other objects, features, and advantages of the invention will become more apparent from the following detailed description taken in conjunction with the accompanying drawings.

BRIEF DESCRIPTION OF THE DRAWINGS

FIG. 8 is a diagram showing an example of the structure of a management table of keys and functions used for determining whether or not processing specific to a present apparatus (apparatus-specific processing) is included in a macro function to be registered at a step S5014 in FIG. 7B;

DETAILED DESCRIPTION OF THE PREFERRED EMBODIMENT

The present invention will now be described in detail with reference to the drawings showing a preferred embodiment thereof.

Figure 1:
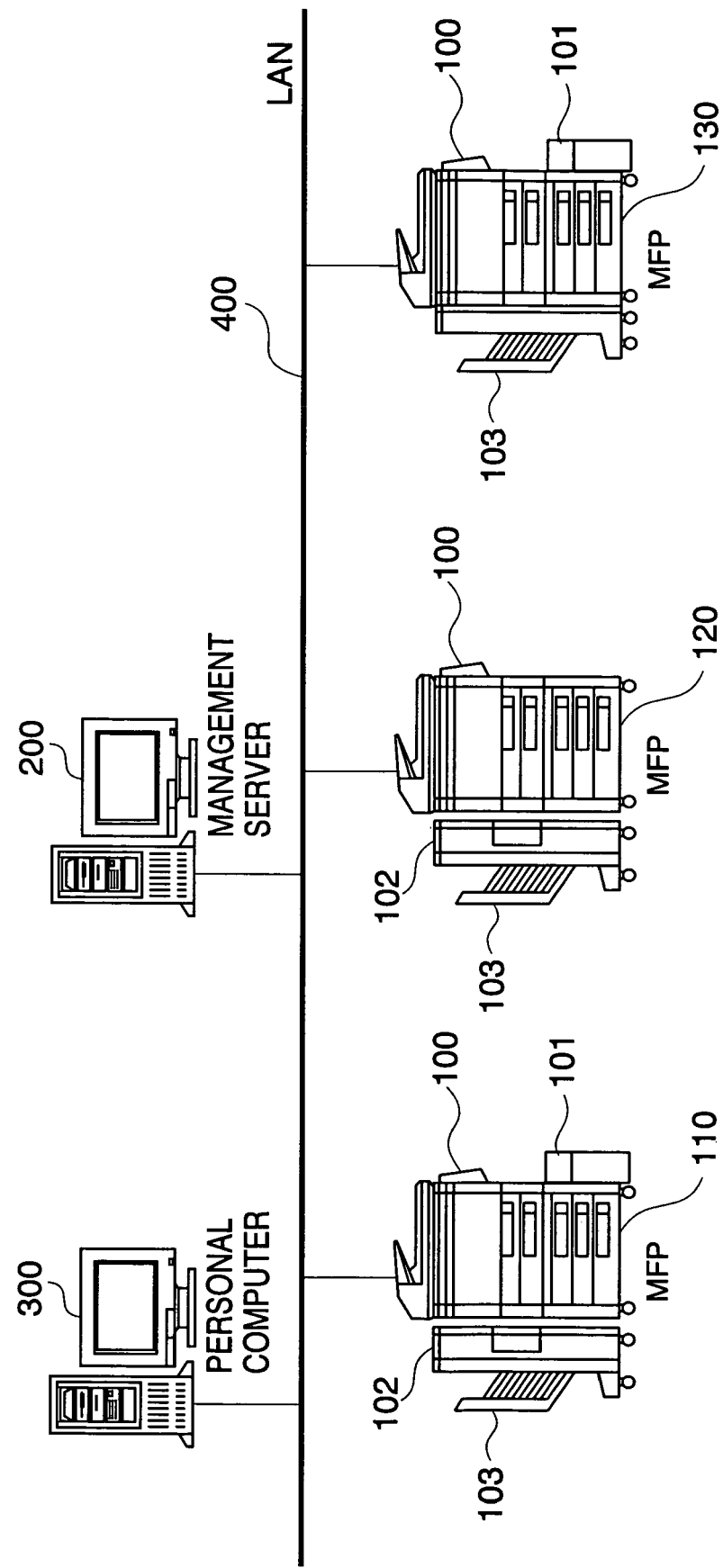
FIG. 1 is a diagram showing the configuration of the whole of a system including MFPs each having a user interface apparatus according to an embodiment of the present invention.

FIG. 1 is a diagram showing the configuration of the whole of a system including MFPs each having a user interface apparatus according to an embodiment of the present invention.

As shown in FIG. 1, the present system is comprised of a plurality of MFPs (multi-function peripherals) 110, 120, and 130, a management server 200, and a personal computer 300, and these components are connected to a LAN (local area network) 400. The LAN 400 is connected via a gate way (not shown) to the Internet.

Each of the MFPs 110, 120, and 130 has a MFP main body (hereinafter referred to as the "main body") 100 having a plurality of functions such as a copy function, a print function, a facsimile function, and an e-mail function, and a plurality of optional units can be connected to the main body 100, as required. The respective MFPs 110, 120, and 130 provide different processing contents according to the kinds of optional units connected to their main bodies 100.

The optional units to be connected to the main bodies 100 of the respective MFPs 110, 120, and 130 include, for example, a side paper deck 101, a puncher unit 102, and a finisher 103. The side paper deck 101 is capable of having a great number (for example, approximately 3500) of paper sheets of a predetermined size (for example, A4 or B5) stacked thereon and automatically feeds the sheets stacked to the main body 100 when the sheets contained in the main body 100 runs out. The puncher unit 102 punches holes (for example, 2 holes) in sheets printed by the main body 100. The finisher 103 provides a sort function of discharging sheets printed by a predetermined number of sheets at a time to separate trays, and a staple function of stapling a bundle of sheets printed at positions thereof specified by the user.

The MFP 110 is constructed such that the respective optional units of the side paper deck 101, the puncher unit 102, and the finisher 103 are connected to its main body 100. Moreover, the MFP 120 is constructed such that the respective optional units of the puncher unit 102 and the finisher 103 are connected to its main body 100. Moreover, the MFP 130 is constructed such that the respective optional units of the side paper deck 101 and the finisher 103 are connected to its main body 100.

The management server 200 performs control relating to the MFPs such as control of jobs for the respective MFPs 110, 120, and 130, color calibration control, and security function control.

The personal computer 300 has a function of transmitting print jobs to the respective MFPs 110, 120, and 130, a function of receiving image data scanned by the respective MFPs 110, 120, and 130 in the form of e-mail from the respective MFPs 110, 120, and 130, and a function of performing Internet and facsimile transmission/reception.

Figure 2:
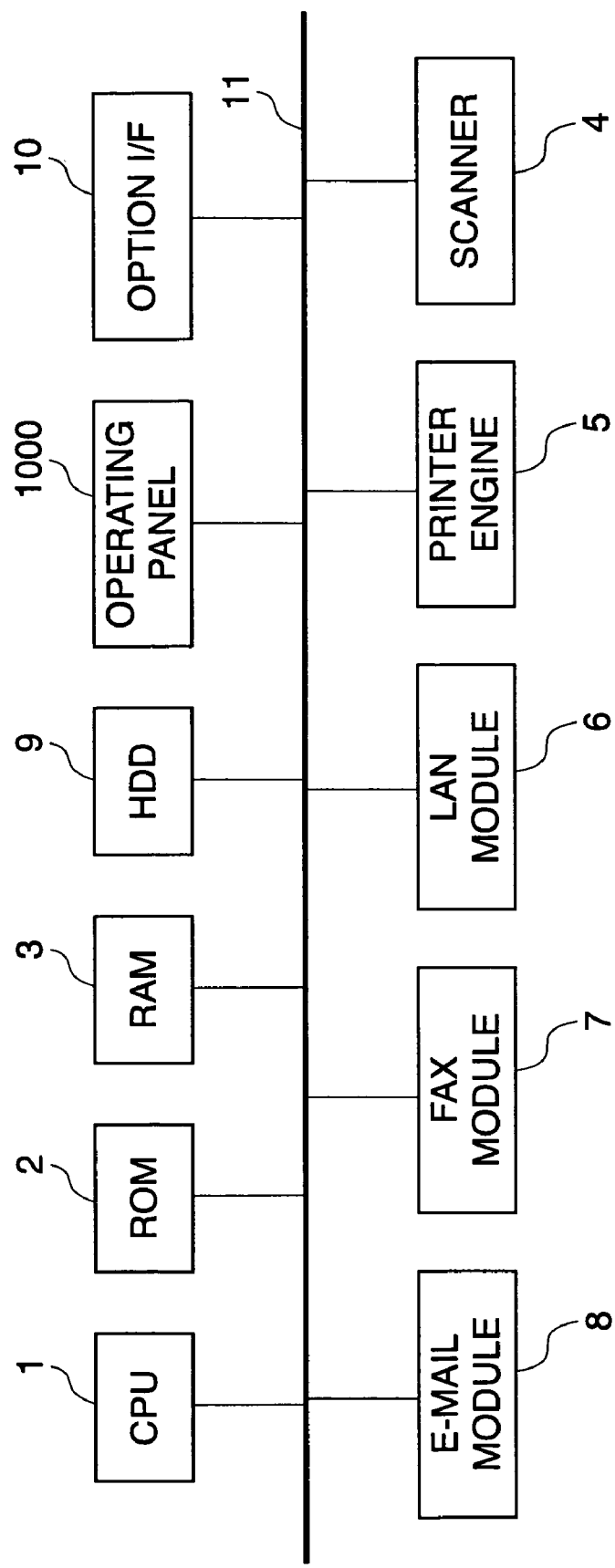
FIG. 2 is a block diagram showing the configuration of the main body 100 of each of the MFPs 110, 120, and 130 in FIG. 1.

Next, the configuration of the main body 100 of the respective MFPs 110, 120, and 130 will be described with reference to FIG. 2. FIG. 2 is a block diagram showing the configuration of the main body 100 of each of the MFPs 110, 120, and 130 in FIG. 1.

As shown in FIG. 2, the main body 100 of each of the MFPs 110, 120, and 130 has a CPU 1 that controls the whole apparatus according to programs stored in a ROM 2 and performs various processes. The ROM 2, a RAM 3, a scanner 4, a printer engine 5, a LAN module 6, a FAX module 7, an e-mail module 8, a hard disk drive (HDD) 9, an option I/F 10, and an operating panel 1000 are connected via an internal bus 11 to the CPU 1.

The scanner 4 reads image data on an original document and outputs the image data. The printer engine 5 prints an image or images on sheets based on the image data read by the scanner 4. The LAN module 6 is connected to the LAN 400 and performs communication control for communicating with other apparatuses through the LAN 400. The FAX module 7 is connected to a telephone line (not shown) and performs facsimile transmission/reception over the telephone line. The e-mail module 8 can transmit image data read by the scanner 4 along with e-mail. The hard disk 9 stores image data read by the scanner 4, macro functions, substitute macro functions, and other data. The option I/F 10 is an interface for connecting optional units such as the side paper deck 101, the puncher unit 102, and the finisher 103, and these optional units are controlled via the option I/F 10 by the CPU 1. The operating panel 1000 cooperates with the CPU 1 to constitute a user interface apparatus for selecting and setting various modes, inputting various kinds of information, and displaying set modes or inputted information.

Figure 3:
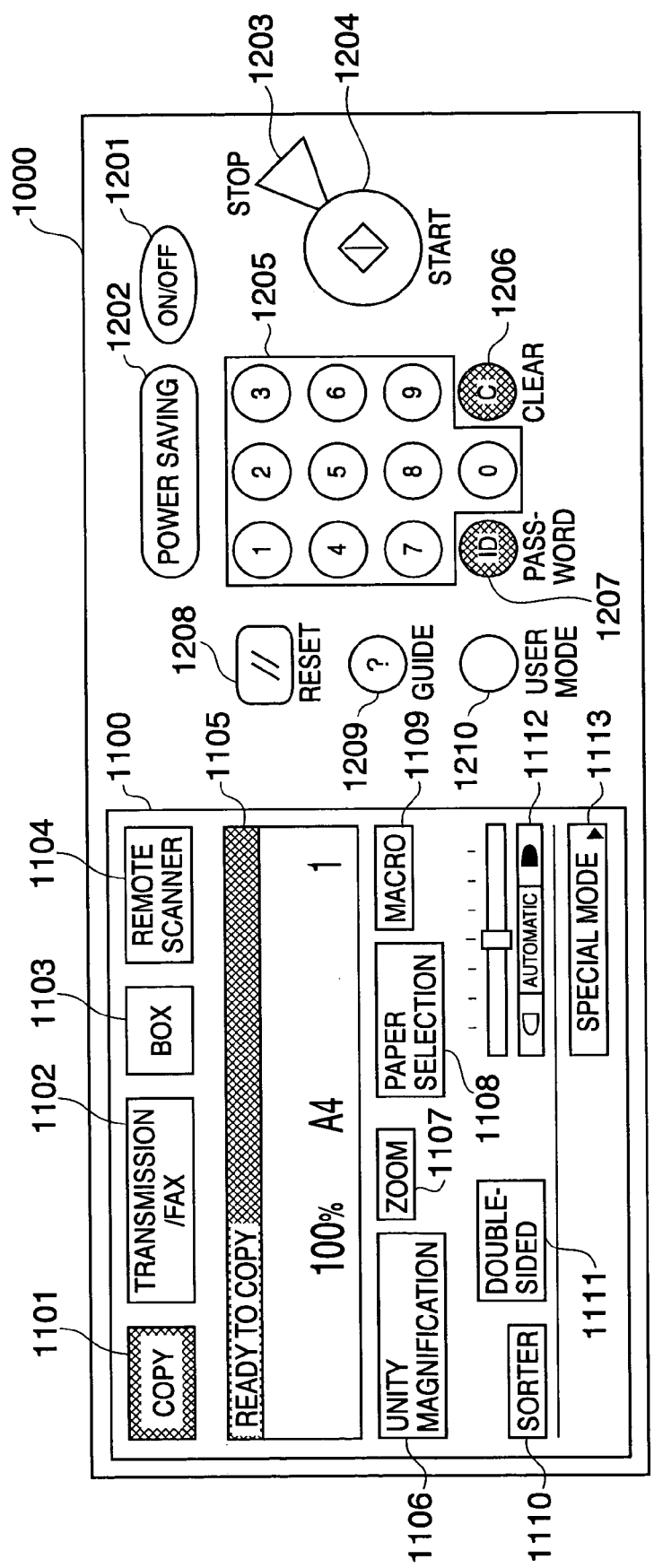
FIG. 3 is a view showing the layout of an operating panel 1000 in FIG. 2.

Next, the layout of the operating panel 1000 will be described with reference to FIG. 3. FIG. 3 is a view showing the layout of the operating panel 1000 in FIG. 2.

As shown in FIG. 3, the operating panel 1000 is provided with a liquid crystal monitor 1100, a power supply key 1201, a power saving key 1202, a stop key 1203, a start key 1204, ten keys 1205, a clearing key 1206, a password key 1207, a reset key 1208, a guide key 1209, and a user mode key 1210.

The power supply key 1201 is used for turning on or off the power supply of the MFP. The power saving key 1202 is used for instructing the MFP to shift to a low power consumption mode. The stop key 1203 is used for stopping a job that is being performed by the MFP. The start key 1204 is used for instructing the MFP to start a job. The ten keys 1205 are for inputting numerical parameters relating to a job performed by the MFP. The clearing key 1206 is used for clearing parameters relating to a job inputted by the user. The password key 1207 is used for instructing user authentication when the MFP shifts to a security mode for limiting users. The reset key 1208 is used for resetting parameters set or inputted to the MFP. The guide key 1209 is used for instructing the user to shift to a guide mode for explaining functions of the MFP. The user mode key 1210 is used for instructing the user to start setting of the MFP.

The liquid crystal monitor 1100 displays services provided by the MFP in the form of a menu to the user. Moreover, in the present embodiment, the liquid crystal monitor 1100 is provided with a touch panel function (not shown), and the user can operate the MFP by touching soft keys such as menu keys displayed on the liquid crystal monitor 1100. On the liquid crystal monitor 1100 are displayed various information. For example, an initial screen as shown in FIG. 3 is displayed on the liquid crystal monitor 1100. The user can instruct the MFP to perform desired processing by touching a corresponding button while this initial screen is displayed.

On the initial screen of the liquid crystal monitor 1100 are displayed a copy mode key 1101, a transmission/FAX mode key 1102, a box mode key 1103, a remote scanner mode key 1104, a state display window 1105 for displaying the state of the MFP, an unity magnification instruction key 1106, a zooming key 1107, a paper selection key 1108, a macro key 1109, a sorter key 1110, a double-sided printing instruction key 1111, a print density adjustment key 1112, and a special mode shift key 1113.

The copy mode key 1101 is pressed when copy is performed. The transmission/FAX mode key 1102 is pressed when the image data read by the scanner 4 is transmitted in the form of e-mail or transmitted via facsimile. The box mode key 1103 is pressed when image data read by the scanner 4 and stored in the hard disk 9 is transmitted. The remote scanner mode key 1104 is pressed when the scanner 4 of another MFP is used via the LAN 400. The state display window 1105 displays the present state of the MFP. In the case of the example shown in FIG. 3, the state display window 1105 displays that the mode is a copy mode, the copy magnification is unity magnification, the paper size is A4, and the number of copies is 1. The unity magnification instruction key 1106 is used for setting the copy magnification to unity magnification. The zooming key 1107 is used for zooming the copy magnification to 25, 50, 61, 70, 81, 86, 115, 122, 141, 200, and 400%. The macro key 1109 is used for setting and calling a macro function. The sorter key 1110 is used for sorting sheets of printed on page-by-page basis or on group-by-group basis when sheets of printed are discharged to the finisher 103 and for instructing outputting sheets with the positions of the sheets shifted as well as for indicating whether to carry out stapling when printed sheets are discharged. The double-sided printing instruction key 1111 is used for instructing double-sided printing or copying based on an original document subjected to single-sided printing and double-sided printing or copying based on an original document subjected to double-sided printing. The print density adjustment key 1112 is used for adjusting density at the time of copying. The special mode shift key 1113 is used for instructing processing such as 2-in-1 printing of printing two page original images on one page, bookbinding printing, copying images on original documents of different sizes, printing in monochrome, adjustment of image quality, and printing in a specified area.

Figure 4:
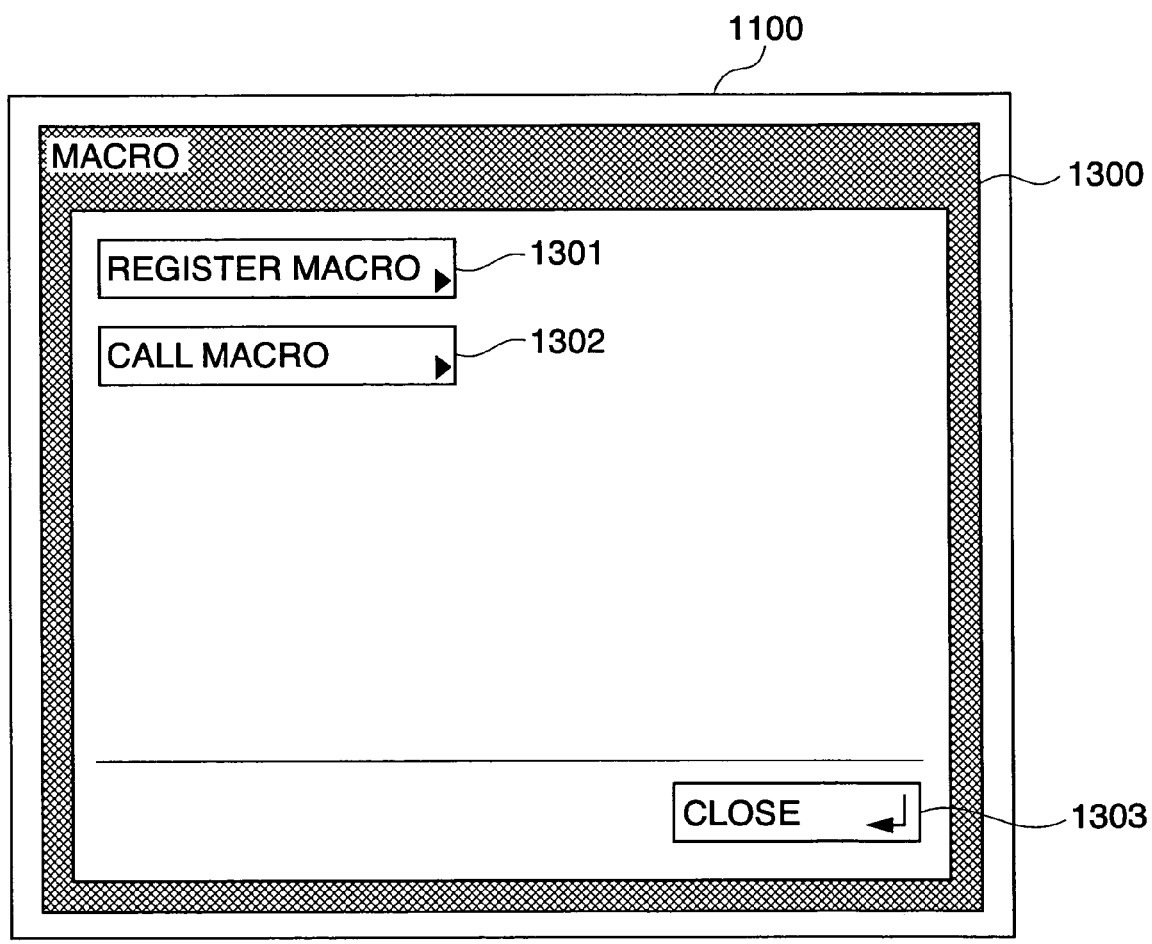
FIG. 4 is a view showing the screen layout of a macro mode window.
Figure 5:
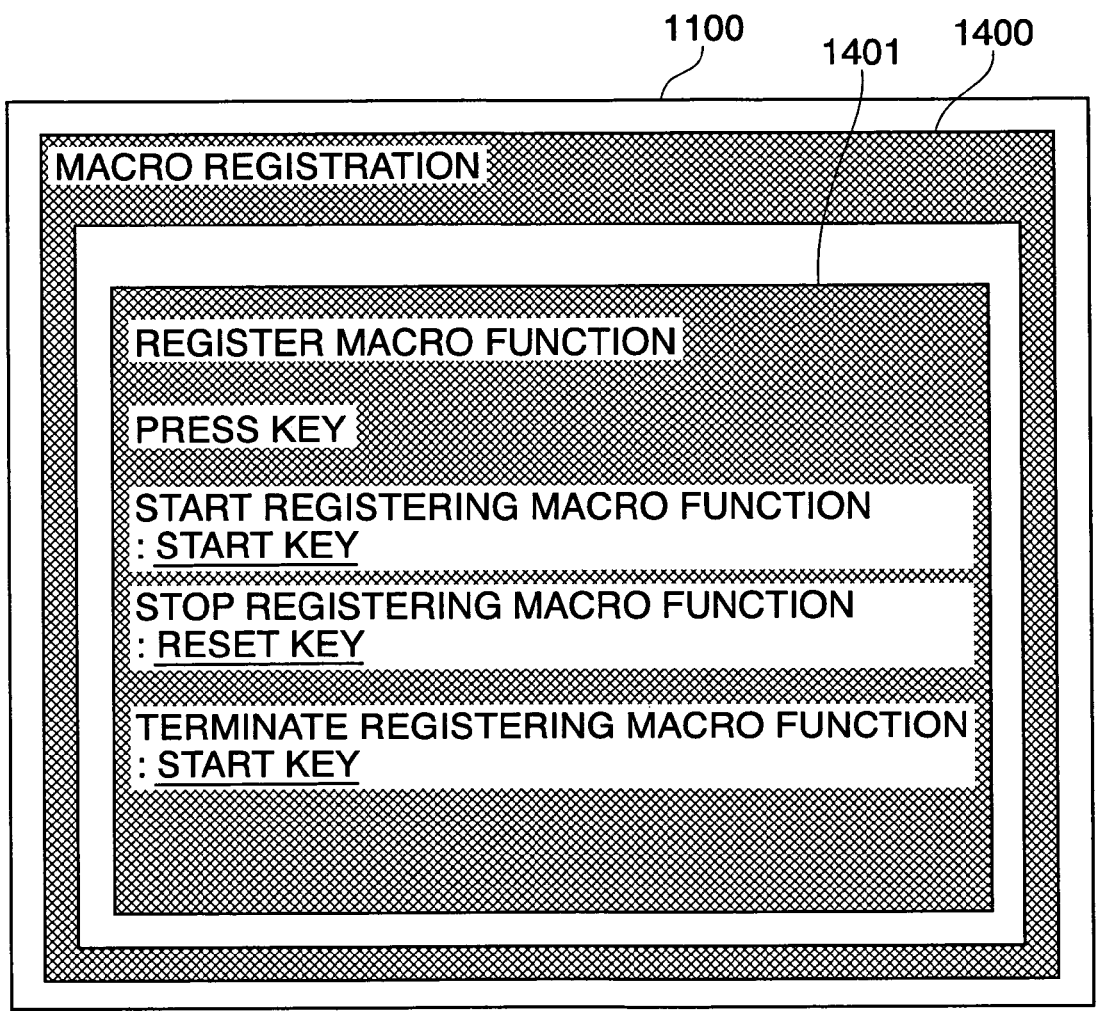
FIG. 5 is a view showing the screen layout of a macro function registration mode window.
Figure 6:
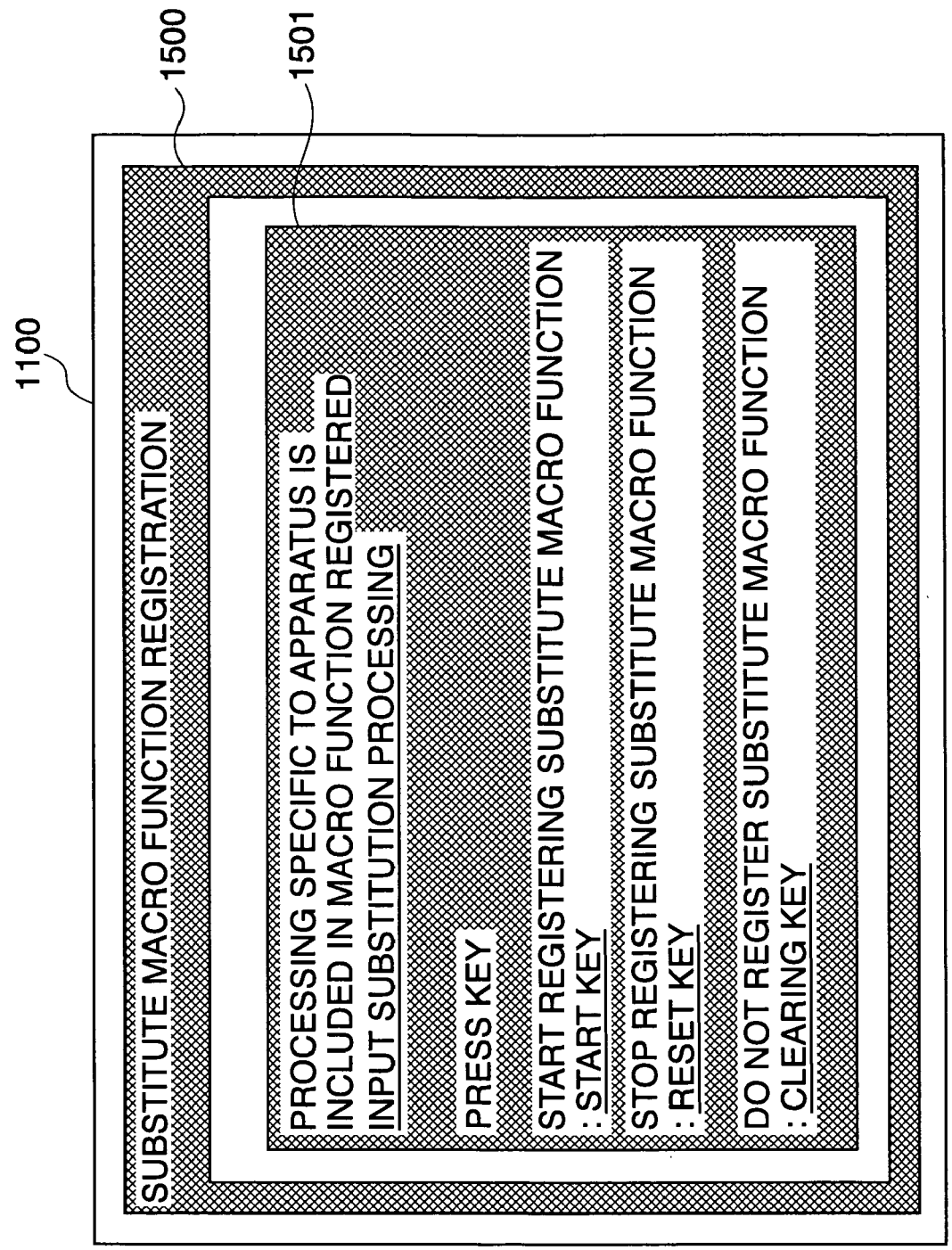
FIG. 6 is a view showing the screen layout of a substitute macro function registration mode window.

Next, a macro mode in the present embodiment will be described with reference to FIG. 4 to FIG. 6. FIG. 4 is a view showing the screen layout of a macro mode window. FIG. 5 is a view showing the screen layout of a macro function registration mode window. FIG. 6 is a view showing the screen layout of a substitute macro function registration mode window.

When the macro key 1109 is pressed in the initial screen (shown in FIG. 3) of the liquid crystal monitor 1100, the macro mode window 1300 for registering or calling a macro function, shown in FIG. 4, is displayed on the liquid crystal monitor 1100. In this macro mode window 1300 are displayed a macro registration key 1301 to be pressed when the user registers a macro function, a macro call key 1302 to be pressed when the user calls a macro function already registered, and a key 1303 to be pressed when the macro mode is finished and the liquid crystal monitor 1100 is returned into the initial screen shown in FIG. 3.

When the macro registration key 1301 is pressed, a macro function registration mode window 1400 shown in FIG. 5 is displayed on the liquid crystal monitor 1100. A macro function registration method instruction window 1401 is displayed on this macro registration function mode window 1400 and the user can start to register a macro function according to the macro function registration method instruction window 1401.

Moreover, when processing specific to the present apparatus is included in a macro function to be registered on the macro registration mode window 1400, as shown in FIG. 6, a substitute macro registration mode window 1500 for urging the user to input substitute processing is displayed. The user can start to register the substitute macro function according to a substitute macro function registration method instruction window 1501.

Figure 7A:
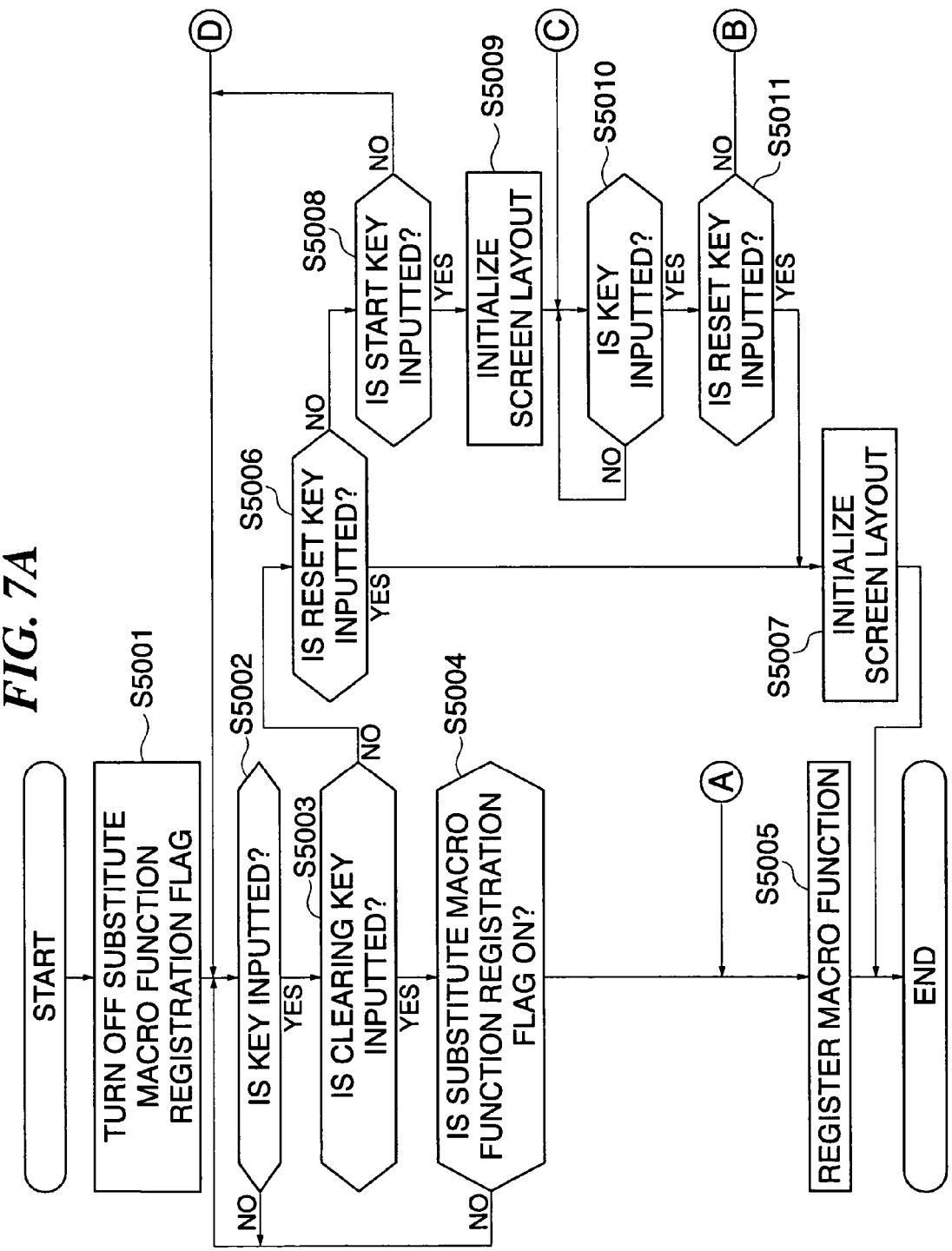
FIGS. 7A and 7B are flowcharts showing the procedure of a macro function registration process in the MFP in FIG. 1.
Figure 7B:
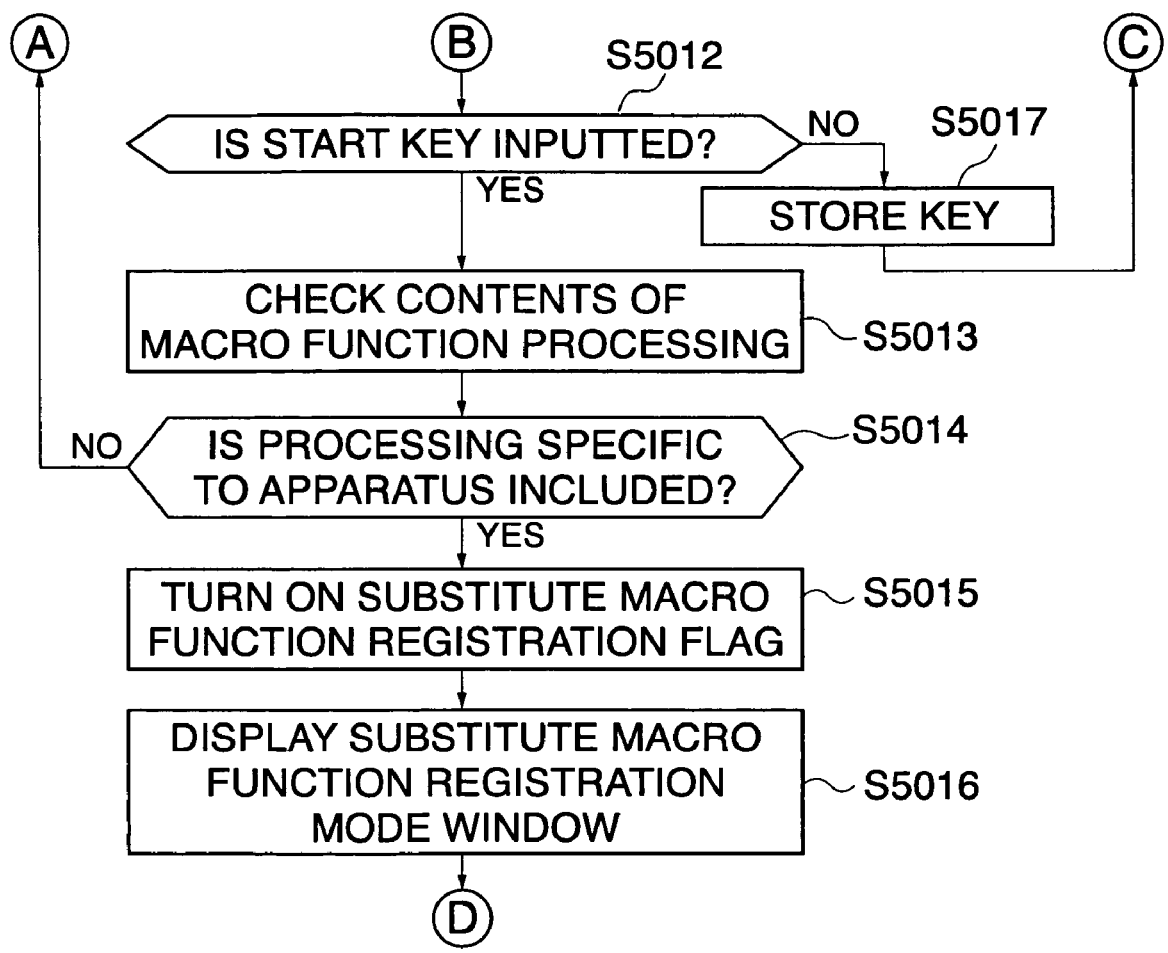

Next, the registration of a macro function will be described with reference to FIGS. 7A and 7B. FIGS. 7A and 7B are flowcharts showing the procedure of a macro function registration process in the MFP in FIG. 1. This procedure is executed by the CPU 1 according to a program stored in the ROM 2.

When the registration of a macro function is performed, the macro function registration key 1301 on the macro mode window 1300 shown in FIG. 4 is pressed. Then, the macro function registration mode window 1400 shown in FIG. 5 is displayed and the macro function registration process shown in FIGS. 7A and 7B is started. When this process is started, the CPU 1 turns off a substitute macro function registration flag as the initialization of an internal state thereof (step S5001) and waits for a key to be inputted (step S5002).

When a key is inputted, the CPU 1 determines whether or not the inputted key is the clearing key 1206 (step S5003). If the inputted key is the clearing key 1206, the CPU 1 determines whether or not the substitute macro function registration flag is ON (step S5004). If the substitute macro function registration flag is not ON, that is, is OFF, the inputted key is neglected and the process again returns to the step S5002 where the CPU 1 waits for a key to be inputted. In contrast to this, if the substitute macro function registration flag is ON, the CPU 1 registers a desired macro (step S5005) and terminates the macro function registration process.

If it is determined in the step S5003 that the inputted key is not the clearing key 1206, the CPU 1 determines whether or not the inputted key is the reset key 1208 (step S5006). If the inputted key is the reset key 1208, the CPU 1 initializes the screen layout of the macro function registration mode (step S5007) and terminates the macro function registration process. In contrast to this, when it is determined in the step S5006 that the inputted key is not the reset key 1208, the CPU 1 determines whether or not the inputted key is the start key 1204 (step S5008). If the inputted key is not the start key 1204, the process again returns to the step S5002.

In contrast to this, if it is determined in the step S5008 that the inputted key is the start key 1204, the CPU 1 initializes the screen layout of the macro function registration mode (step S5009) and waits for the user to input a key (register a key) (step S5010). When the user inputs a key, the CPU 1 determines whether or not the inputted key is the reset key 1208 (step S5011). If the inputted key is the reset key 1208, the CPU 1 initializes the screen layout of the macro function registration mode (step S5007) and terminates the macro function registration process.

If it is determined in the step S5011 that the inputted key is not the reset key 1208, the CPU 1 determines whether or not the inputted key is the start key 1204 (step S5012). If the inputted key is not the start key 1204, the CPU 1 stores the inputted key (step S5017). Then, the process again returns to the step S5010 where the CPU 1 waits for the user to input a key.

If it is determined in the step S5012 that the inputted key is the start key 1204, the CPU 1 determines that the macro function registration process should be terminated, actually executes the inputted processing, and checks the processing contents of the macro function to be registered (step S5013). Then, the CPU 1 determines with reference to a management table of keys and functions, which will be described later (shown in FIG. 8), whether or not processing specific to the present apparatus (apparatus-specific processing) is included in the macro function to be registered (step S5014). If the apparatus-specific processing is included in the macro function to be registered, the CPU 1 turns on the substitute macro function registration flag (step S5015) and displays the substitute macro function registration mode window 1500 shown in FIG. 6 (step S5016). Then, the process returns to the step S5002 where the CPU 1 waits for the user to input a key.

In contrast to this, if it is determined in the step S5014 that the apparatus-specific processing is not included in the macro function to be registered, the CPU 1 registers the macro function to be registered (step S5005) and terminates the macro function registration process.

Next, the management table of keys and functions used for determining whether or not the processing specific to the present apparatus (apparatus-specific processing) is included in the macro function to be registered (step S5014) will be described with reference to FIG. 8.

FIG. 8 is a view showing an example of the layout of the management table of keys and functions used for determining whether or not the processing specific to the present apparatus (apparatus-specific processing) is included in the macro function to be registered in the step S5014 in FIG. 7B.

The management table 2000 of keys and functions shown in FIG. 8 is comprised of key IDs 2001, function IDs 2002 as macro functions to be registered, identified by the key IDs 2001, and specific function flags 2003 indicating whether or not keys corresponding to the key IDs 2001 are assigned to functions specific to the apparatus. The management table 2000 of keys and functions is stored in the hard disk of the hard disk drive 9.

The key IDs 2001 are assigned specifically to all operating keys existing on the operating panel (user interface) 1000 including the liquid crystal monitor 1100 (hard keys and all soft keys displayed on the liquid crystal monitor 1100). The function IDs to which the keys belong are assigned to the key IDs 2001, respectively: for example, a copy function ID is assigned to the copy key 1101, a transmission/FAX function ID is assigned to the transmission/FAX key 1102, and a macro function ID is assigned to the macro key 1109. When one of the key IDs 2001 is assigned to a function specific to the apparatus, "1" is set to a specific function flag 2003 corresponding to the key ID 2001, and when one of the key IDs 2001 is assigned to a function common to the apparatuses on the network, "0" is set to the specific function flag 2003 corresponding to the key ID 2001. When a macro function is registered, the determination as to whether or not an apparatus-specific processing is included in the macro function to be registered (step S5014 in FIG. 7B) is made based on the specific function flag 2003.

Figure 9:
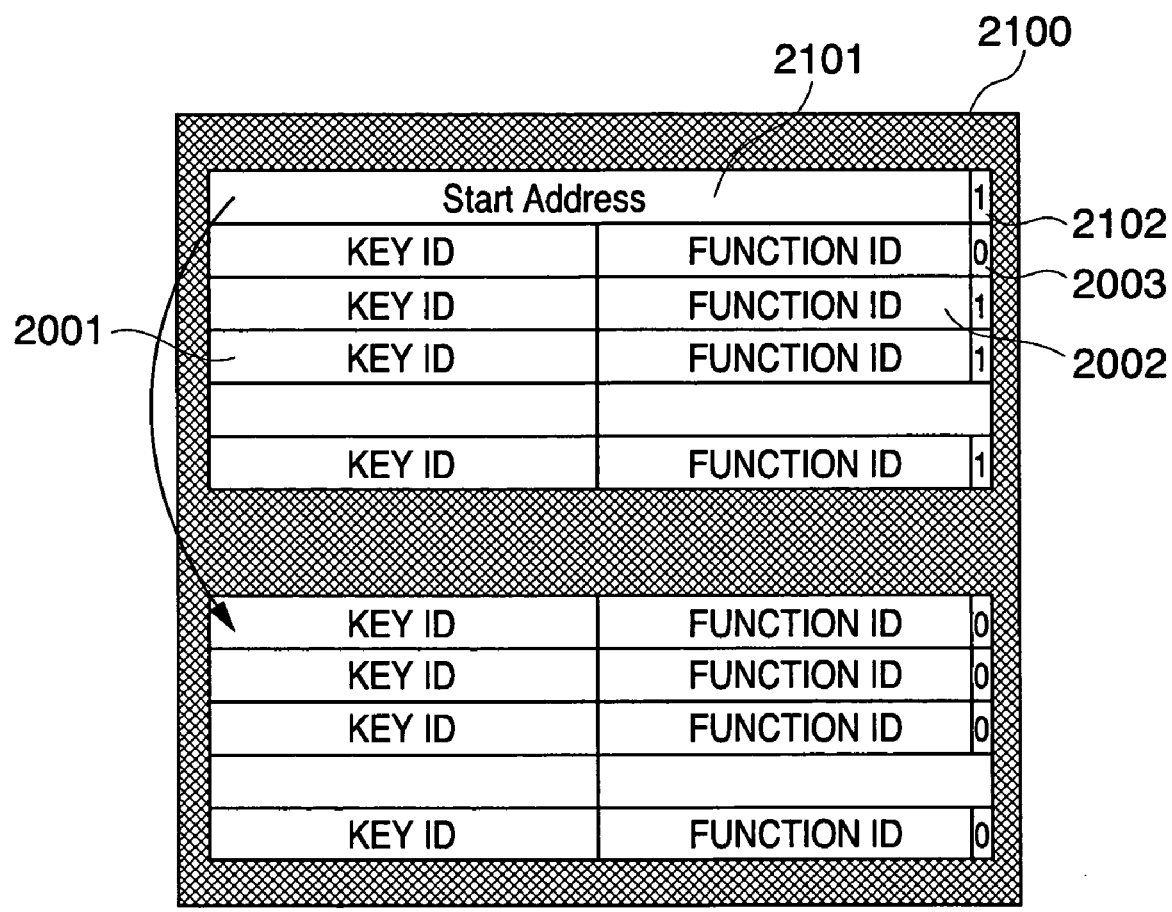
FIG. 9 is a diagram showing an example of the structure of a macro function registration table in which macro functions are registered.

Next, a macro function registration table in which macro functions are registered will be described with reference to FIG. 9. FIG. 9 is a diagram showing an example of the structure of the macro function registration table in which macro functions are registered.

In the macro function registration table 2100 shown in FIG. 9, there are registered the key IDs 2001, the function IDs 2002, and the specific function flags 2003 for macro functions registered by the user. Moreover, if there is a substitute macro function, a start address 2101 and a substitute macro function registration flag 2102 for the substitute macro function are registered in the macro function registration table 2100. When a substitute macro function is registered, the first address 2101 is used for referring to a substitute macro function registration table existing in the macro function registration table 2100. When a substitute macro function is not registered in the macro function registration table 2100, the substitute macro function registration flag 2102 shows "0", and when the substitute macro function is registered in the macro function registration table 2100, the substitute macro function registration flag 2102 shows "1". The macro function registration table 2100 is stored in the hard disk of the hard disk drive 9.

Next, a description will be given of a case where the user registers a macro function using the MFP 110 out of the MFPs 110, 120, and 130 connected to the LAN 400.

A macro function including, for example, double-sided printing, 2-in-1 processing, feeding of sheets to the side paper deck 101, punching of sheets by the puncher unit 102, and stapling of a bundle of sheets at an upper left position thereof by the finisher 103 is registered as a macro function 1. In this case, the side paper deck 101 and puncher unit 102 of the MFP 110 are already registered as options specific to the MFP 110, so that when the macro function 1 is registered in the macro function registration table 2100, "1" is set to its specific option flag 2003. Therefore, the MFP 110 urges the user to register a substitute macro function (step S5016). At this time, when the user pressed the clearing key 1206 (YES to the step S5003), the registration of the substitute macro function is cancelled and only a desired macro function is registered (step S5005).

Moreover, when a macro function in which a deck (not shown) of the main body 100 of the MFP 110 is a destination to which sheets are to be fed and the puncher unit 102 is not used is registered as a substitute macro function 1' by the user, this substitute macro function 1' does not include processing of using any function specific to the MFP 110 (NO to the step S5014), so that the macro function 1 and the substitute macro function 1' are registered in the macro function registration table 2100 (step S5005).

In this way, when the user registers a macro function including apparatus-specific processing of the MFP 110 in the MFP 110, the user is urged to register a substitute macro function for substitute processing that substitutes for the processing corresponding to the macro function and hence the user can register the substitute macro function, which can be performed by the other MFPs 120, 130 on the LAN 400, in the MFP 110.

Figure 10:
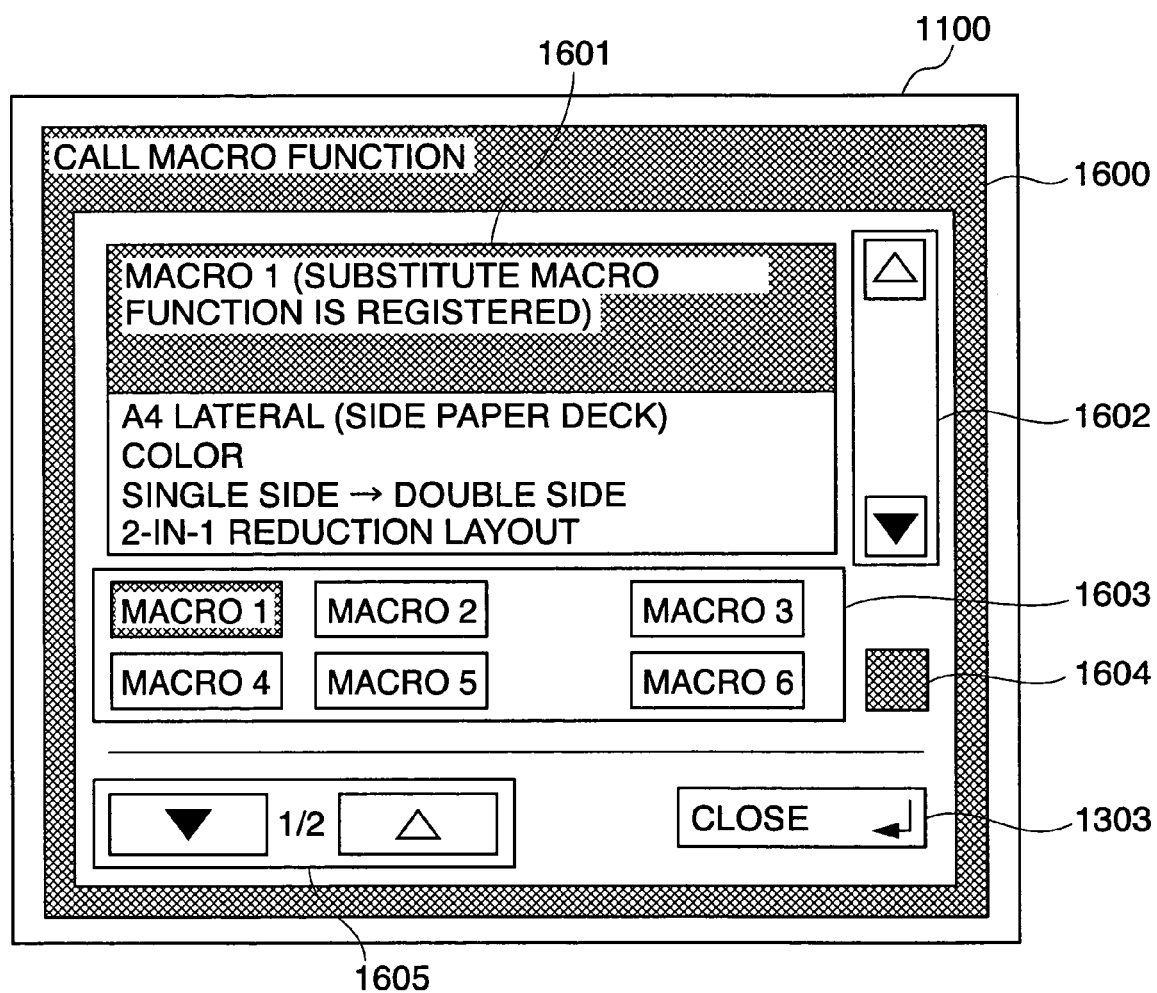
FIG. 10 is a view showing the screen layout of a macro function calling mode window.

Next, the call for a macro function will be described with reference to FIG. 10. FIG. 10 is a view showing the screen layout of a macro function calling mode window.

When the macro function call key 1302 is pressed on the macro mode window 1300 shown in FIG. 4, the macro function calling mode window 1600 is displayed on the liquid crystal monitor 1100. The macro function calling mode window 1600 includes a macro function information display window 1601, a scroll bar 1602 for the macro information display window, at least one registered macro function call key 1603, a substitute macro function call key 1604, a scroll bar 1605 for the registered macro function call key, and a key 1303 for closing the macro function calling mode window 1600.

The set content of a macro function to be called is displayed on the macro function information display window 1601. When a substitute macro function is registered for a selected macro function, a message is displayed on the macro information display window 1601 to the effect that the substitute macro function is registered for the selected macro function. The scroll bar 1602 for the macro information display window scrolls up and down the macro information display window 1601. When all information in the macro information display window 1601 cannot be outputted, the user can check all information in the macro information display window 1601 by operating the scroll bar 1602. Assigned to the registered macro function call keys 1603 are assigned respective registered macro functions. The substitute macro function call key 1604 is used for calling a substitute macro function registered in association with a selected macro function, and the user can call a substitute macro function by operating the substitute macro function call key 1604 and use the substitute macro function. The scroll bar 1605 for the registered macro function call keys scrolls up and down the registered macro call keys 1603, and when all of the registration macro call keys 1603 cannot be outputted, the user can check all of the registration macro call keys 1603 by operating the scroll bar 1605.

When the user calls the macro function 1 and the substitute macro function 1', which are registered in the MFP 110, in the MFP 120, the user presses the macro call key 1302. Then, the MFP 120 starts a macro function calling mode and refers to the macro functions registered in the MFP 110 and the MFP 130 via the LAN 400. When the user selects, for example, the macro function 1 from among the functions assigned to the registered macro call keys 1603, the MFP 120 checks whether or not any processing content which the MFP 120 cannot perform is included in the contents of the processing registered as the macro function 1 based on the key ID 2001 and the function ID 2002 which are registered for the macro function 1 and the management table 2000 of keys and functions which is stored in the MFP 120. Since the processing using the side paper deck 101, which is not attached to the MFP 120, is registered as the macro function 1, the MFP 120 cannot perform the macro function 1 as it is. Therefore, when the user is going to perform the macro function 1 by the MFP 120, the MFP 120 outputs to the user a message indicating that the macro function 1 cannot be performed and urging the user to use a substitute macro function.

When the user presses the substitute macro function call key 1604 in response to the message, the MFP 120 checks again the contents of the processing of the substitute macro function 1'. Since the substitute macro function 1' has the contents of the processing for which no function ID specific to the MFP 110 is registered and which the MFP 120 can perform, the substitute macro function 1' can be normally processed by the MFP 120. When the user selects and performs the substitute macro function 1' in the MFP 120, the substitute macro function 1' is loaded down to the hard disk of the hard disk drive 9 of the MFP 120 and is registered as a macro function that can be normally used by the MFP 120. When the user subsequently performs the substitute macro function 1' in the MFP 120, the processing for checking the contents of the processing in the MFP 120 is omitted and hence the processing time period required before the substitute macro function 1' starts to be performed can be shortened.

In the present embodiment, macro functions are stored in the MFPs in which the macro functions are actually registered by the user. However, it is also possible to store the macro functions registered by the user in the management server 200 and manage the macro functions in a collective manner.

Further, in the present embodiment, when the user calls a macro function in a MFP, one or more macro functions that cannot be performed by the MFP are also displayed on the liquid crystal monitor 1100 of the MFP. However, it may be configured such that the macro function(s) that cannot be performed by the MFP are not displayed or displayed in a hatched state or the like.

Further, in the present embodiment, when the user selects and performs a substitute macro function in a MFP in which the user calls a macro function, the performed substitute macro function is registered in the hard disk of the MFP in which the user has called the macro function. However, when substitute macro functions are managed in a collective manner by the management server 200, alternatively, substitute macro functions may be stored in the management server 200 in association with the respective MFPs in which the user has called up the corresponding macro functions.

Furthermore, in the present embodiment, the registration and calling of a macro function are performed in a MFP with the user interface apparatus mounted therein. However, the present invention can be applied to registration and calling of a macro function in another type of processing apparatus.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+ RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-228376 filed Aug. 4, 2004, which is hereby incorporated by reference herein.

What is claimed is:

1. A user interface apparatus for providing interface between an apparatus and a user comprising:
   a first registering device that registers at least a processing operating procedure for performing processing by the apparatus;
   a second registering device that registers a substitute processing operating procedure for performing substitute processing that substitutes for the processing corresponding to the processing operating procedure registered by said first registering device, in association with the processing operating procedure registered by said first registering device;
   a determining device that determines whether or not processing specific to the apparatus is included in the processing corresponding to the processing operating procedure registered by said first registering device when the processing operating procedure is registered by said first registering device; and
   a notifying device that urges a user to register the substitute processing operating procedure of the substitute processing when said determining device determines that the processing specific to the apparatus is included in the processing corresponding to the processing operating procedure registered by said first registering device,
   wherein:
   said first registering device registers the processing operating procedure using a first operating key assigned thereto, and when the first operating key is operated, the apparatus performs the processing operating procedure to select and set the processing corresponding to the processing operating procedure; and
   said second registering device registers the substitute processing operating procedure using a second operating key assigned thereto, which is different from the first operating key, and when the second operating key is operated, the apparatus performs the substitute processing operating procedure to select and set the substitute processing corresponding to the substitute processing operating procedure.

2. A processing apparatus comprising:
   a reading device that reads an original document to generate image data; and
   a user interface apparatus that gives an instruction for processing the image data generated by said reading device,
   wherein said user interface apparatus comprises:
   a first registering device that registers at least a processing operating procedure for performing processing by the apparatus;

a second registering device that registers a substitute processing operating procedure for performing substitute processing that substitutes for the processing corresponding to the processing operating procedure registered by said first registering device, in association with the processing operating procedure registered by said first registering device;

a determining device that determines whether or not processing specific to the apparatus is included in the processing corresponding to the operating procedure registered by said first registering device when the processing operating procedure is registered by said first registering device; and a notifying device that urges a user to register the substitute processing operating procedure of the substitute processing when said determining device determines that the processing specific to the apparatus is included in the processing corresponding to the processing operating procedure registered by said first registering device, wherein:

said first registering device registers the processing operating procedure using a first operating key assigned thereto, and when the first operating key is operated, the apparatus performs the processing operating procedure to select and set the processing corresponding to the processing operating procedure; and said second registering device registers the substitute processing operating procedure using a second operating key assigned thereto, which is different from the first operating key, and when the second operating key is operated, the apparatus performs the substitute processing operating procedure to select and set the substitute processing corresponding to the substitute processing operating procedure.

3. A user interface method for providing interface between an apparatus and a user, the method comprising:

a first registering step that registers at least a processing operating procedure for performing processing by the apparatus;

a second registering step that registers a substitute processing operating procedure for performing substitute processing that substitutes for the processing corresponding to the processing operating procedure registered by said first registering step, in association with the processing operating procedure registered by said first registering step;

a determining step that determines whether or not processing specific to the apparatus is included in the processing corresponding to the processing operating procedure registered by said first registering step when the processing operating procedure is registered by said first registering step; and a notifying step that urges a user to register the substitute processing operating procedure of the substitute processing when said determining step determines that the processing specific to the apparatus is included in the processing corresponding to the processing operating procedure registered by said first registering step, wherein:

said first registering step registers the processing operating procedure using a first operating key assigned thereto, and when the first operating key is operated, the apparatus performs the processing operating procedure to select and set the processing corresponding to the processing operating procedure; and said second registering step registers the substitute processing operating procedure using a second operating key assigned thereto, which is different from the first operating key, and when the second operating key is operated, the apparatus performs the substitute processing operating procedure to select and set the substitute processing corresponding to the substitute processing operating procedure.

4. A computer-readable storage medium storing a program that when executed by a user interface apparatus causes the user interface apparatus to execute a user-interface method for providing interface between an apparatus and a user, the program comprising:

a first registering module that registers at least a processing operating procedure for performing processing by the apparatus;

a second registering module that registers a substitute processing operating procedure for performing substitute processing that substitutes for the processing corresponding to the processing operating procedure registered by said first registering module, in association with the processing operating procedure registered by said first registering module;

a determining module that determines whether or not processing specific to the apparatus is included in the processing corresponding to the processing operating procedure registered by said first registering module when the processing operating procedure is registered by said first registering module; and a notifying module that urges a user to register the substitute processing operating procedure of the substitute processing when said determining module determines that the processing specific to the apparatus is included in the processing corresponding to the processing operating procedure registered by said first registering module, wherein:

said first registering module registers the processing operating procedure using a first operating key assigned thereto, and when the first operating key is operated, the apparatus performs the processing operating procedure to select and set the processing corresponding to the processing operating procedure; and said second registering module registers the substitute processing operating procedure using a second operating key assigned thereto, which is different from the first operating key, and when the second operating key is operated, the apparatus performs the substitute processing operating procedure to select and set the substitute processing corresponding to the substitute processing operating procedure.

* * * * *